(12) United States Patent
Lu et al.

(10) Patent No.: US 11,561,594 B2
(45) Date of Patent: Jan. 24, 2023

(54) ELECTRONIC DEVICE AND METHOD OF POWER SUPPLY PROTECTION FOR CONNECTION PORT

(71) Applicants: Shih-Chin Lu, Taipei (TW); Yao-Cheng Lee, Taipei (TW)

(72) Inventors: Shih-Chin Lu, Taipei (TW); Yao-Cheng Lee, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 180 days.

(21) Appl. No.: 17/095,741

(22) Filed: Nov. 12, 2020

(65) Prior Publication Data
US 2021/0200291 A1   Jul. 1, 2021

Related U.S. Application Data

(60) Provisional application No. 62/953,524, filed on Dec. 25, 2019.

(51) Int. Cl.
*G06F 1/30* (2006.01)
*H02J 7/00* (2006.01)

(52) U.S. Cl.
CPC ............ *G06F 1/305* (2013.01); *H02J 7/0031* (2013.01); *H02J 7/00308* (2020.01); *H02J 2207/30* (2020.01)

(58) Field of Classification Search
CPC ...... G06F 1/305; H02J 7/00308; H02J 7/0031; H02J 2207/30
USPC .......................................................... 361/88
See application file for complete search history.

(56) References Cited

U.S. PATENT DOCUMENTS

| | | | | |
|---|---|---|---|---|
| 2006/0267553 A1* | 11/2006 | Chuang | ...................... | H02J 5/00 320/128 |
| 2008/0054863 A1* | 3/2008 | Chuang | .................. | H01M 10/48 323/262 |
| 2013/0124892 A1* | 5/2013 | Lu | ............................ | G06F 1/30 713/322 |

* cited by examiner

*Primary Examiner* — Yemane Mehari
(74) *Attorney, Agent, or Firm* — JCIPRNET

(57) ABSTRACT

An electronic device and a method of a power supply protection for a connection port are provided. The electronic device includes a first connection port with a first switch and a first controller and a first control circuit. The first controller determines a first preset value according to a state of the first switch activation signal correspondingly, and detects whether the first input voltage of the first connection port is greater than the first preset value. When the first input voltage is greater than the first preset value, the first controller enables a first abnormal signal on the first abnormal state detection pin. In response to a first forced closing signal being enabled, the first controller controls the first switch to disconnect both terminals.

15 Claims, 4 Drawing Sheets

ELECTRONIC DEVICE AND METHOD OF POWER SUPPLY PROTECTION FOR CONNECTION PORT

CROSS-REFERENCE TO RELATED APPLICATION

This application claims the priority benefit of U.S. provisional application Ser. No. 62/953,524, filed on Dec. 25, 2019. The entirety of the above-mentioned patent application is hereby incorporated by reference herein and made a part of this specification.

BACKGROUND

Technical Field

The disclosure relates to a technology of power supply protection for a connection port in an electronic device, and more particularly to an electronic device and a method of power supply protection for a connection port.

Description of Related Art

For consumer electronic devices to come with diversified functions, such as charging and data conversion when there is a single connection port, currently most consumer electronic devices have connection ports, such as USB type-C connection ports, lighting ports, and the like, which can transmit power.

Moreover, for consumer electronic devices to have the requirement of basic safety protection in power output and input, relevant international organizations have formulated relevant regulations, such as the IEC 60950-1 standard promulgated by the International Electromechanical Commission (IEC), as a standard specification, so that audiovisual products, consumer electronic products, and products of information and communication technology have a unified safety standard.

One of the tests in the IEC 60950-1 standard is that when a connection port with power transmission function is broken, it is hoped that the consumer electronic device can limit the output power in its current path, thereby ensuring that the consumer electronic device still has the function of power supply protection in case of breakage. In other words, when the connection port of the consumer electronic device is connected to other components or power transmission lines but the connection port of the consumer electronic device is broken, because the device has the function of power supply protection regulated in the IEC 60950-1 standard, the risk of spontaneous combustion is prevented.

SUMMARY

The disclosure provides an electronic device and a method of power supply protection for a connection port. By separately defining the abnormal state detection signal and the global forced closing signal and designing the operation mode of the control circuit accordingly, it is more convenient to expand the design for multiple connection ports, and connection ports with high power ratings can be supported with the terminals of multiple control circuits connected to each other in parallel.

The electronic device of power supply protection for the connection port in the disclosure includes a first connection port and a first control circuit. The first control circuit is coupled to the first connection port. The first control circuit includes a first switch and a first controller. The first terminal of the first switch receives a first input voltage of the first connection port, and the second terminal of the first switch is coupled to the output terminal of the first control circuit. The first controller is coupled to the control terminal of the first switch. The first controller receives a first switch activation signal and receives the first forced closing signal through a first forced closing pin. The first controller determines a first preset value according to a state of the first switch activation signal correspondingly and detects whether the first input voltage of the first connection port is greater than the first preset value. Moreover, a first abnormal signal on a first abnormal state detection pin is enabled through the first controller when the first input voltage is greater than the first preset value. Furthermore, in response to the first forced closing signal being enabled, the first controller controls the first switch to disconnect both terminals.

The method of the power supply protection for a connection port in the disclosure is adapted to be applied to an electronic device including a first connection port and a first control circuit. The method includes the following steps. Obtain a first input voltage from the first connection port through the first control circuit, obtain a first switch activation signal, and obtain a first forced closing signal through a first forced closing pin. Determine a first preset value according to a state of the first switch activation signal correspondingly through the first control circuit. Detect whether the first input voltage is greater than the first preset value through the first control circuit. Enable a first abnormal signal on a first abnormal state detection pin through the first control circuit when the first input voltage is greater than the first preset value. Determine whether the first forced closing signal is enabled through the first control circuit. In addition, control the first switch to disconnect both terminals through the first control circuit when the first forced closing signal is enabled, wherein a first terminal of the first switch receives a first input voltage of the first connection port, and a second terminal of the first switch is coupled to an output terminal.

Based on the above, the electronic device in the embodiments of the disclosure correspondingly designs a control circuit at each connection port. The control circuit primarily sets the operation mode for two signals (i.e., the abnormal state detection signal and the global forced closing signal) and the corresponding pins, and works with the activation control pin to realize the function of power supply protection for the connection port. In addition, the control circuit can also be applied to multiple connection ports, so that those implementing the embodiments of the disclosure can easily expand the design for multiple connection ports to save the circuit area, and furthermore the connection ports with high power ratings can be supported by the various terminals of the multiple control circuits connected to each other in parallel.

DESCRIPTION OF THE EMBODIMENTS

Figure 1:
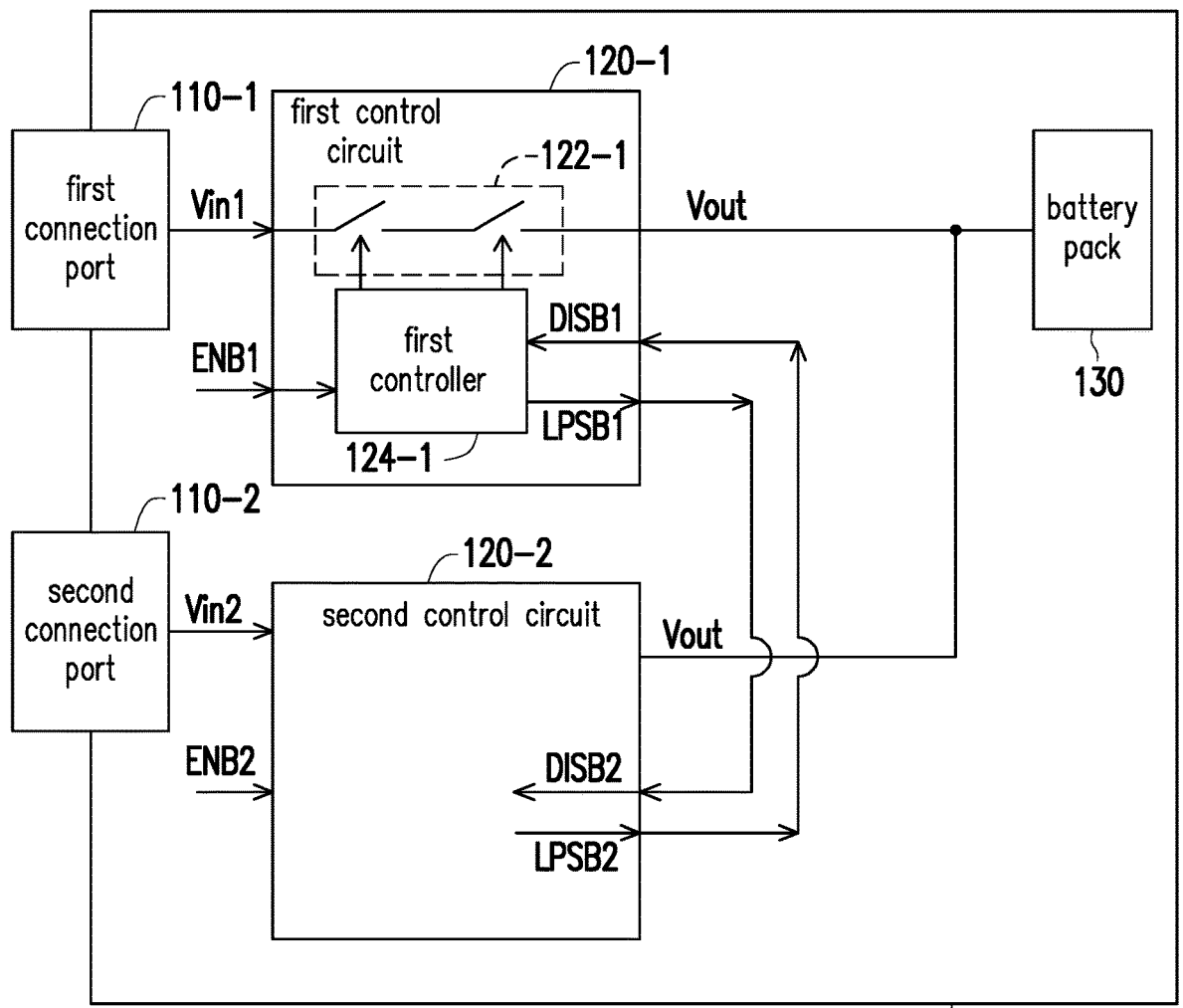
FIG. 1 is a schematic block view of an electronic device of power supply protection for a connection port according to the first embodiment of the disclosure.

FIG. 1 is a schematic block view of an electronic device 100 of power supply protection for a connection port according to the first embodiment of the disclosure. Two connection ports are illustrated as an example in the electronic device 100 in FIG. 1, namely a first connection port 110-1 and a second connection port 110-2. The connection ports 110-1 and 110-2 in the embodiment are mainly adapted to transmit power. Moreover, the connection ports 110-1 and 110-2 in the embodiment may also correspondingly transmit digital data. The connection ports 110-1 and 110-2 in the embodiment conform to the USB type-C protocol or the Lighting protocol. In addition to the connection ports 110-1 and 110-2, the electronic device 100 mainly includes a first control circuit 120-1 corresponding to the first connection port 110-1 and a second control circuit 120-2 corresponding to the second connection port 110-2.

The first control circuit 120-1 is coupled to the first connection port 110-1 to receive a first input voltage Vin1, and the second control circuit 120-2 is coupled to the second connection port 110-2 to receive a second input voltage Vin2. The internal circuit structures of the first control circuit 120-1 and the second control circuit 120-2 in the embodiment are the same. Therefore, the first control circuit 120-1 is primarily illustrated. Those implementing the embodiment may apply the operation mode of the first control circuit 120-1 to the second control circuit 120-2.

The electronic device 100 further includes a battery pack 130 to store power. The output terminals of the first control circuit 120-1 and the second control circuit 120-2 are coupled to the battery pack 130 to store the power from the first connection port 110-1 or the second connection port 110-2. The first control circuit 120-1 and the second control circuit 120-2 in the embodiment of the disclosure are adapted to realize the function of power supply protection for the connection ports 110-1 and 110-2, so that it is possible that at the design stage, the electronic device 100 is already capable of preventing the risk of spontaneous combustion due to breakage.

The first control circuit 120-1 includes a first switch 122-1 and a first controller 124-1. The first terminal of the first switch 122-1 receives the first input voltage Vin1 of the first connection port 110-1. The second terminal of the first switch 122-1 is coupled to the output terminal of the first control circuit 120-1 to generate an output voltage Vout. The first controller 124-1 is coupled to the control terminal of the first switch 122-1. The first controller 124-1 receives a first switch activation signal ENB1 and receives the first forced closing signal through a first forced closing pin DISB1.

The first switch activation signal ENB1 in the embodiment is an enabling signal provided when the electronic device 100 activates the first control circuit 120-1. In addition, the first controller 124-1 in the first control circuit 120-1 correspondingly determines a first preset value (or referred to as a reference voltage level) for detecting whether the input voltage is abnormal according to the logic state of the first switch activation signal ENB1. Correspondingly, the second switch activation signal ENB2 is an enabling signal provided when the electronic device 100 activates the second control circuit 120-2. In addition, the second controller in the second control circuit 120-2 correspondingly determines a second preset value (or referred to as a reference voltage level) for detecting whether the input voltage is abnormal according to the logic state of the second switch activation signal ENB2.

A first abnormal state detection pin LPSB1 of the first controller 124-1 is coupled to a second forced closing pin DISB2 of the second controller so that the first abnormal signal is served as the second forced closing signal. The second abnormal state detection pin LPSB2 of the second controller is coupled to the first forced closing pin DISB1 of the first controller 124-1 so that the second abnormal signal is served as the first forced closing signal.

It is assumed that the rated operating voltage of the electronic device 100 in the embodiment is set to 21V as an example. In the embodiment, when the first switch activation signal ENB1 is disabled, it means that currently the first connection port 110-1 does not transmit power to the electronic device 100. In this way, the first controller 124-1 determines the first preset value as the first reference value (e.g., 5.8V) correspondingly according to the state of the first switch activation signal ENB1 (i.e., the first switch activation signal ENB1 is disabled), so that the first connection port 110-1 transmits digital data normally but does not obtain a large voltage. The first reference value (5.8V) is less than the rated operating voltage (21V). On the other hand, when the first switch activation signal ENB1 is enabled, it means that currently the first connection port 110-1 transmits power to the electronic device 100. In this way, the first controller 124-1 determines the first preset value as the second reference value (e.g., 24V) correspondingly according to the state of the first switch activation signal ENB1 (i.e., the first switch activation signal ENB1 is enabled), so that the first connection port 110-1 transmits power at a relatively large voltage. The second reference value (24V) is greater than the rated operating voltage (21V).

When the first control circuit 120-1 and other control circuits in the electronic device 100 are in a normal operation, the first control circuit 120-1 continuously detects whether the first input voltage Vin1 of the first connection port 110-1 is greater than the first preset value. The first preset value is correspondingly determined by the first controller 124-1 according to the state of the first switch activation signal ENB1. When the first input voltage Vin1 is greater than the first preset value, the first controller 124-1 enables the first abnormal signal on the first abnormal state detection pin LPSB1.

For example, if the first preset value is 5.8V, it means that the first connection port 110-1 has no demand or plan to transmit power. Therefore, the first input voltage Vin1 theoretically is less than or equal to 5.8V. However, if at this time, the first controller 124-1 determines that the first input voltage Vin1 is greater than 5.8V, it means that there is a problem with the first connection port 110-1 or the current line carrying the first input voltage Vin1 and there is risk of breakage. Therefore, the first controller 124-1 generates a first abnormal signal on the first abnormal state detection pin LPSB1, that is, the first abnormal signal is enabled.

If the first abnormal signal is enabled, the second controller in the second control circuit 120-2 receives the first abnormal signal through the second forced closing pin DISB2, and the first abnormal signal is served as the second forced closing signal. In this way, in response to the second forced closing signal being enabled, the second controller in the second control circuit 120-2 controls the second switch to disconnect its both terminals. That is, the current line for the second input voltage Vin2 in the second connection port 110-2 is disconnected from the current line passing through the battery pack 130, so that the spontaneous combustion is prevented.

On the other hand, when the other control circuit (e.g., the second control circuit 120-2) generates an abnormal signal on the first forced closing pin DISB1, the first controller 124-1 regards the abnormal signal as the first forced closing signal. In response to the first forced closing signal being enabled, the first controller 124-1 in the first control circuit 120-1 controls the first switch 122-1 to disconnect its both terminals. That is, the current line for the first input voltage Vin1 in the first connection port 110-1 is disconnected from the current line passing through the battery pack 130, so that the spontaneous combustion is prevented.

Based on the above, the embodiment of the disclosure allows one of the control circuits to transmit the abnormal signal to the global forced closing pin when determining that the corresponding connection port is abnormal, so that other control circuits learn about the abnormality. Moreover, when another control circuit learns that one of the control circuits determines that the corresponding connection port is abnormal, the another control circuit immediately disconnects the current line of the input voltage of the corresponding connection port from the current line of the battery pack, so that the current line of the corresponding connection port is prevented from being connected to the current line of the connection port that may be broken, and thereby the spontaneous combustion is prevented to a certain extent.

The first switch 122-1 in the embodiment may include two sub-switches, and the control terminals of the two sub-switches are controlled by the first controller 124-1. When the first abnormal signal has been generated on the first abnormal state detection pin LPSB1, if the voltage value of the first input voltage Vin1 is no longer too large, the embodiment also releases/disables/resets the first abnormal signal on the first abnormal state detection pin LPSB1. For example, if the original first input voltage Vin is greater than 5.8V, but then its voltage value decreases (maybe the user unplugs the connection line on the first connection port 110-1 or other circumstances), the first controller 124-1 further determines whether the first input voltage Vin1 of the first connection port 110-1 is less than a reset voltage value (e.g., 3.6V). The reset voltage value (3.6V) is less than the first reference value (5.8V). In detail, when the first controller 124-1 has enabled the first abnormal signal on the first abnormal state detection pin LPSB1, if the first input voltage Vin1 is less than the reset voltage value (3.6V), the first input voltage Vin1 does not subject the current line of the first input voltage Vin1 to the risk of breakage. Therefore, the first controller 124-1 disables/resets the first abnormal signal on the first abnormal state detection pin LPSB1 at this time.

Since the voltage connection state of each connection port is relatively unstable when the electronic device 100 is activated, at this time, the first controller 124-1 may make a misjudgment when determining the voltage value of the first input voltage. Therefore, in the embodiment, after the electronic device 100 is activated for a preset time (e.g., 2.5 seconds), the first controller 124-1 starts to detect whether the first input voltage Vin1 of the first connection port 110-1 is greater than the first preset value determined by the embodiment.

Figure 2:
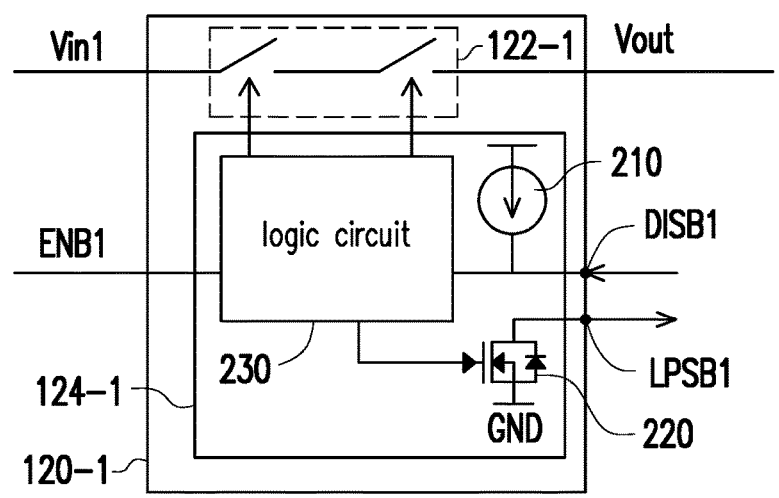
FIG. 2 is a circuit block view of a control circuit according to various embodiments of the disclosure.

FIG. 2 is a circuit block view of a control circuit according to various embodiments of the disclosure. The first control circuit 120-1 of FIG. 2 is illustrated as an example. Furthermore, the first control circuit 120-1 of FIG. 2 may be an exemplary instance for the structure of the control circuit in each embodiment of the disclosure. The first control circuit 120-1 primarily includes a first switch 122-1 and a first controller 124-1. The first controller 124-1 primarily includes a current source 210, a grounding switch 220, and a logic circuit 230.

The current source 210 is coupled to the first forced closing pin DISB1. The first terminal of the grounding switch 220 is coupled to a ground terminal GND. The second terminal of the grounding switch 220 is coupled to the first abnormal state detection pin LPSB1. The grounding switch 220 in the embodiment may be implemented by an N-type transistor. The control terminal of the grounding switch 220 is coupled to the logic circuit 230. In other words, the grounding switch 220 is controlled by the logic circuit 230. When the first forced closing signal on the first forced closing pin DISB1 is not enabled, the current source 210 maintains the first forced closing pin DISB1 in the disabled state of the first forced closing signal (i.e., the voltage of the first forced closing pin DISB1 is logic high). In contrast, when the first forced closing signal on the first forced closing pin DISB1 is enabled, the first forced closing pin DISB1 is maintained in the enabled state of the first forced closing signal (i.e., the voltage of the first forced closing pin DISB1 is logic low). In detail, in the embodiment, the enabled state of the first forced closing signal is controlled by the grounding switch 220 of the logic circuit 230 to pull down the voltage of the first abnormal state detection pin LPSB1 to the level of the ground terminal GND. The logic circuit 230 correspondingly determines the first preset value according to the state of the first switch activation signal ENB1. Moreover, the logic circuit 230 detects whether the first input voltage Vin1 of the first connection port is greater than the first preset value. When the first input voltage Vin1 is greater than the first preset value, the logic circuit 230 in the first controller 124-1 controls the grounding switch 220 to connect its both terminals, so that the first abnormal signal is enabled on the first abnormal state detection pin LPSB1, and the first abnormal signal in the embodiment is logic low (e.g., the ground voltage).

Figure 3:
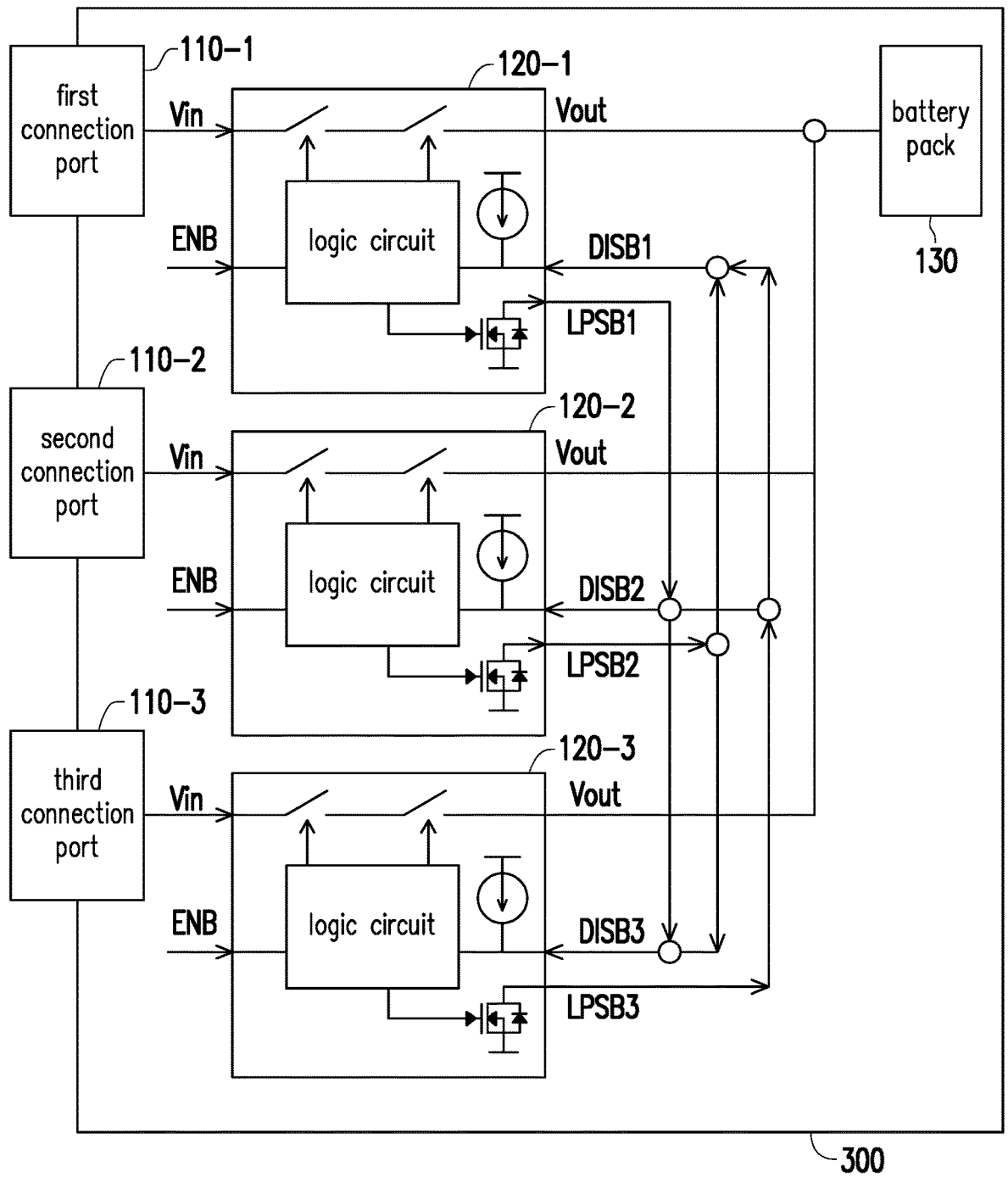
FIG. 3 is a schematic block view of an electronic device of power supply protection for a connection port according to the second embodiment of the disclosure.

FIG. 3 is a schematic block view of an electronic device 300 of power supply protection for a connection port according to the second embodiment of the disclosure. In the second embodiment, the electronic device 300 includes three connection ports 110-1 to 110-3 and corresponding control circuits 120-1 to 120-3. The first and the second embodiments are mainly adapted to illustrate that when the rated load power (e.g., 160W) of the first connection port 110-1 is less than or equal to the rated load power (e.g., 165W) of the first controller 124-1, those implementing the embodiments of the disclosure can implement the expansion design of multiple connection ports in the electronic devices 100 and 300 with the control circuits 120-1 to 120-3 connected to each other in parallel.

In detail, the first abnormal state detection pin LPSB1 of the first control circuit 120-1 is electrically coupled to the second forced closing pin DISB2 of the second control circuit 120-2 and the third forced closing pin DISB3 of the third control circuit 120-3. The second abnormal state detection pin LPSB2 of the second control circuit 120-2 is electrically coupled to the first forced closing pin DISB1 of the first control circuit 120-1 and the third forced closing pin DISB3 of the third control circuit 120-3. The third abnormal state detection pin LPSB3 of the third control circuit 120-3 is electrically coupled to the first forced closing pin DISB1 of the first control circuit 120-1 and the second forced closing pin DISB2 of the second control circuit 120-2.

Figure 4:
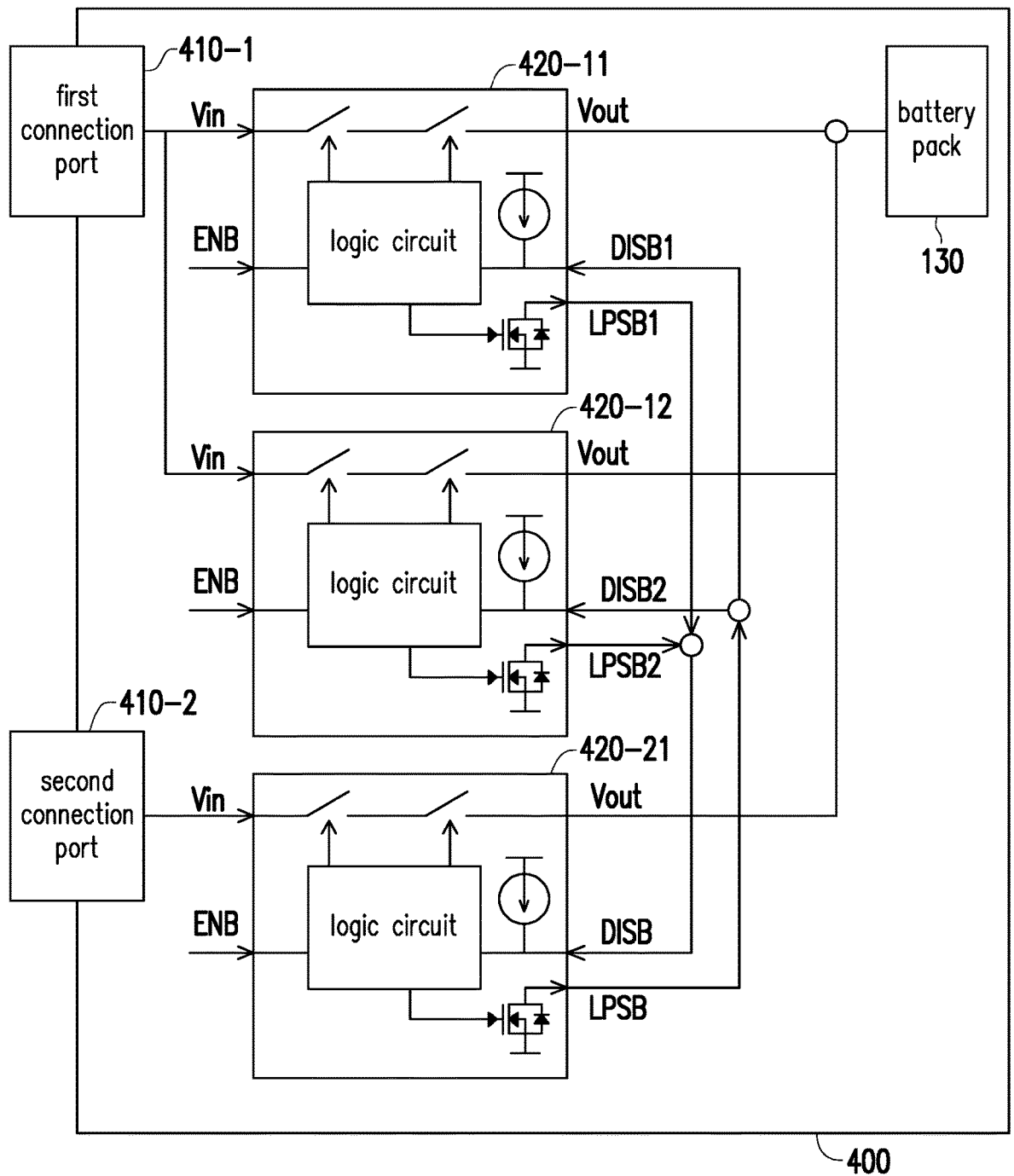
FIG. 4 is a schematic block view of an electronic device of power supply protection for a connection port according to the third embodiment of the disclosure.

FIG. 4 is a schematic block view of an electronic device 400 of power supply protection for a connection port according to the third embodiment of the disclosure. The difference between the third embodiment of FIG. 4 and the first embodiment of FIG. 1 and the second embodiment of FIG. 3 is that the rated load power (330W) of the first connection port 410-1 is greater than the rated load power (165W) of the first control circuit 420-11, and the rated load power (160W) of the second connection port 410-2 is less than or equal to the rated load power (165W) of the first control circuit 420-11. In order to ensure the first connection port 410-1 may be operated with the function of power supply protection, the electronic device 400 in the embodiment of the disclosure further includes at least one control circuit that is the same as the first control circuit 420-11 (herein referred to as at least one third control circuit 420-12). The corresponding terminals of the first control circuit 420-11 and the at least one third control circuit 420-12 are connected to each other in parallel. In this way, the first connection port 410-1 with high power ratings is supported by the first control circuit 420-11 connected to each other in parallel and the at least one third control circuit 420-12.

In detail, the first connection port 410-1 in the third embodiment corresponds to the first control circuit 420-11 and the third control circuit 420-12. The second connection port 410-2 in the third embodiment corresponds to the control circuit 420-21.

The first abnormal state detection pin LPSB1 of the first control circuit 420-11 is electrically coupled to the second abnormal state detection pin LPSB2 of the third control circuit 420-12 and the forced closing pin DISB of the control circuit 420-21. The first forced closing pin DISB1 of the first control circuit 420-11 is electrically coupled to the third forced closing pin DISB3 of the third control circuit 420-12 and the abnormal state detection pin LPSB of the control circuit 420-21.

Figure 5:
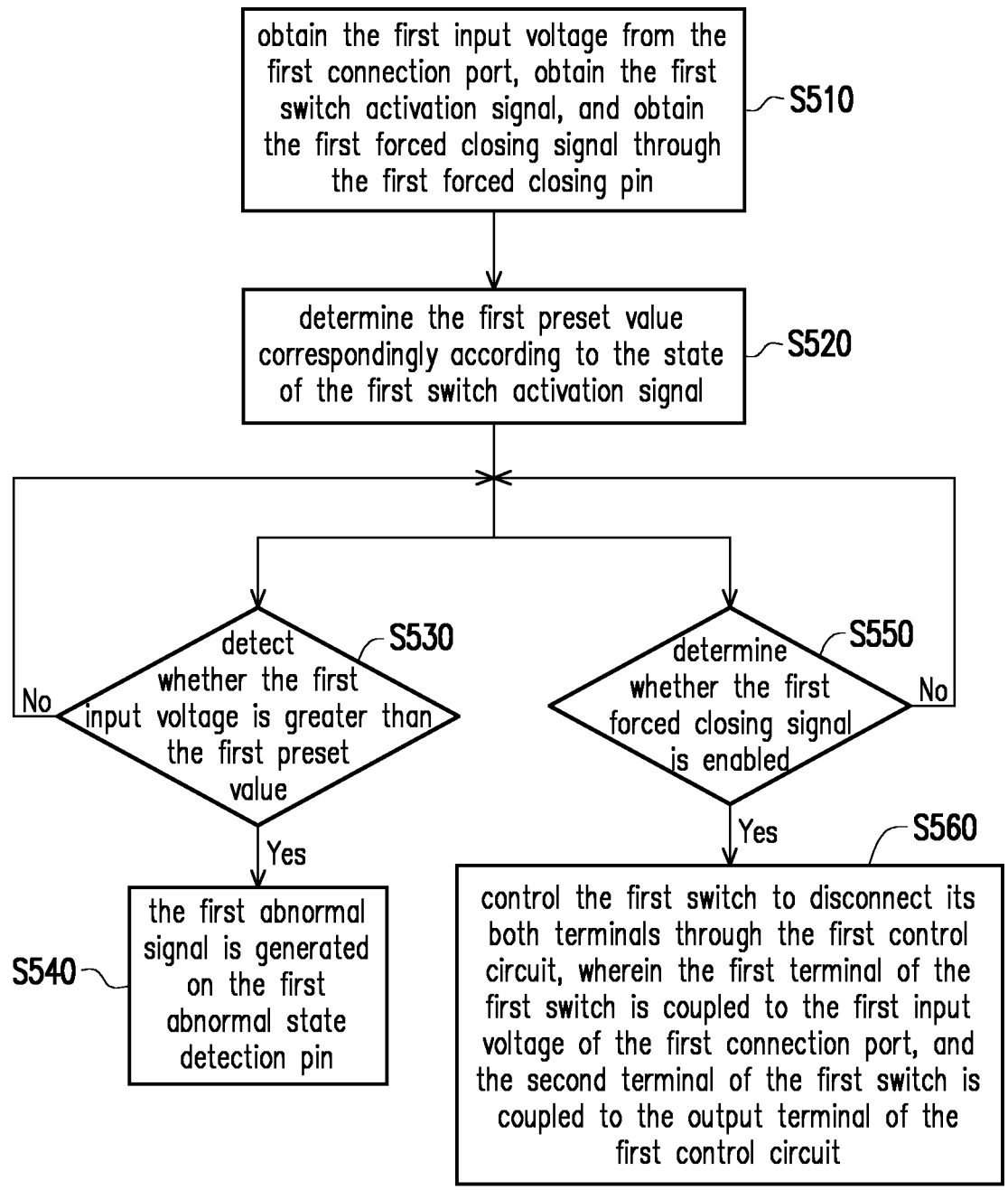
FIG. 5 is a flowchart of a method of power supply protection for a connection port according to various embodiments of the disclosure.

FIG. 5 is a flowchart of a method of power supply protection for a connection port according to various embodiments of the disclosure. The method in FIG. 5 is adapted to be applied to the electronic devices of the foregoing embodiments, and the electronic devices include at least one connection port and a corresponding first control circuit. The first control circuit 120-1 in FIG. 1 is an exemplary illustration of the method in FIG. 5.

In step S510, obtain the first input voltage Vin1 from the first connection port 110-1 through the first control circuit 120-1, obtain the first switch activation signal ENB1, and obtain the first forced closing signal through the first forced closing pin DISB1. In step S520, determine the first preset value correspondingly according to the state of the first switch activation signal ENB1 through the first control circuit 120-1. In the embodiment, after step S520 is completed, step S530 and step S550 may be performed simultaneously or periodically.

In step S530, detect whether the first input voltage Vin1 is greater than the first preset value determined in step S520 through the first control circuit 120-1. If it is no in step S530, return to the step after step S520. In contrast, if it is yes in step S530, proceed from step S530 to step S540. In step S540, when the first input voltage Vin1 is greater than the first preset value, the first abnormal signal is generated on the first abnormal state detection pin LPSB1 through the first control circuit 120-1, that is, the first abnormal signal is enabled on the first abnormal state detection pin LPSB1.

In step S550, the first control circuit 120-1 is adapted to determine whether the first forced closing signal on the first forced closing pin DISB1 is enabled. If it is no in step S550, return to the step after step S520. In contrast, if it is yes in step S550, then proceed from step S550 to step S560. When the first forced closing signal is enabled, control the first switch 122-1 to disconnect both terminals through the first control circuit 120-1, the first terminal of the first switch 122-1 is coupled to the first input voltage of the first connection port 110-1, and the second terminal of the first switch 122-1 is coupled to the output terminal of the first control circuit. For detailed operations of steps S510 to S560 in FIG. 5, refer to the foregoing embodiments.

Based on the above, the electronic device in the embodiment of the disclosure correspondingly designs a control circuit at each connection port. The control circuit primarily sets the operation mode for two signals (i.e., the abnormal state detection signal and the global forced closing signal) and the corresponding pins, and works with the activation control pin to realize the function of power supply protection for the connection port. In addition, the control circuit can also be applied to multiple connection ports, so that those implementing the embodiments of the disclosure can easily expand the design for multiple connection ports to save the circuit area, and furthermore, the connection ports with high power ratings can be supported by the various terminals of the multiple control circuits connected to each other in parallel.

What is claimed is:

1. An electronic device of a power supply protection for a connection port, comprising:
    a first connection port; and
    a first control circuit coupled to the first connection port, wherein the first control circuit comprises:
        a first switch, wherein a first terminal of the first switch receives a first input voltage of the first connection port, and a second terminal of the first switch is coupled to an output terminal of the first control circuit; and
        a first controller coupled to a control terminal of the first switch, wherein the first controller receives a first switch activation signal and receives a first forced closing signal through a first forced closing pin,
    the first controller determines a first preset value according to a state of the first switch activation signal correspondingly and detects whether the first input voltage of the first connection port is greater than the first preset value, and when the first input voltage is greater than the first preset value, the first controller enables a first abnormal signal on a first abnormal state detection pin, and
    in response to the first forced closing signal being enabled, the first controller controls the first switch to disconnect both terminals.

2. The electronic device according to claim 1, wherein when the first switch activation signal is disabled, the first controller sets the first preset value as a first reference value, and
    when the first switch activation signal is enabled, the first controller sets the first preset value as a second reference value, wherein the first reference value is less than the second reference value, and the second reference value is greater than a rated operating voltage of the electronic device.

3. The electronic device according to claim 2, wherein when the first abnormal signal has been enabled on the first abnormal state detection pin, the first controller further determines whether the first input voltage of the first connection port is less than a reset voltage value, wherein the reset voltage value is less than the first reference value, and when the first input voltage is less than the reset voltage value, the first controller disables the first abnormal signal on the abnormal state detection pin.

4. The electronic device according to claim 1, wherein the first controller starts to detect whether the first input voltage of the first connection port is greater than the first preset value after a preset time after the electronic device is activated.

5. The electronic device according to claim 1, wherein the first control circuit comprises:

a current source coupled to the first forced closing pin, wherein when the first forced closing signal on the first forced closing pin is not enabled, the current source maintains the first forced closing pin in a disabled state of the first forced closing signal.

6. The electronic device according to claim 1, wherein the first control circuit comprises:

a grounding switch, wherein a first terminal of the grounding switch is coupled to a grounding terminal, a second terminal of the grounding switch is coupled to the first abnormal state detection pin, and when the first input voltage is greater than the first preset value, the grounding switch turns on both terminals to enable the first abnormal signal on the first abnormal state detection pin.

7. The electronic device according to claim 1, further comprising:

a second connection port; and a second control circuit coupled to the second connection port, wherein the second control circuit comprises:

a second switch, wherein a first terminal of the second switch is coupled to a second input voltage of the second connection port, and a second terminal of the second switch is coupled to an output terminal of the second control circuit; and a second controller coupled to a control terminal of the second switch, wherein the second controller receives a second switch activation signal and receives a second forced closing signal through a second forced closing pin, and the second controller determines a second preset value according to a state of the second switch activation signal and detects whether the second input voltage of the second connection port is greater than the second preset value, and when the second input voltage is greater than the second preset value, the second controller enables a second abnormal signal on a second abnormal state detection pin; and in response to the second forced closing signal being enabled, the second controller controls the second switch to disconnect the both terminals, wherein the first abnormal state detection pin of the first controller is coupled to the second forced closing pin of the second controller so that the first abnormal signal is served as the second forced closing signal, and the second abnormal state detection pin of the second controller is coupled to the first forced closing pin of the first controller so that the second abnormal signal is served as the first forced closing signal.

8. The electronic device according to claim 1, wherein when a rated load power of the first connection port is greater than a rated load power of the first controller, the electronic device further comprises:

at least one third control circuit identical to the first control circuit, wherein the corresponding terminals of the first control circuit and the at least one third control circuit are connected to each other in parallel.

9. The electronic device according to claim 1, wherein the first connection port conforms to a USB type-C protocol.

10. A method of a power supply protection for a connection port adapted to be applied to an electronic device comprising a first connection port and a first control circuit, comprising:

obtaining a first input voltage from the first connection port through the first control circuit, obtaining a first switch activation signal, and obtaining a first forced closing signal through a first forced closing pin;

determining a first preset value according to a state of the first switch activation signal correspondingly through the first control circuit;

detecting whether the first input voltage is greater than the first preset value through the first control circuit;

enabling a first abnormal signal on a first abnormal state detection pin through the first control circuit when the first input voltage is greater than the first preset value;

determining whether the first forced closing signal is enabled through the first control circuit; and controlling a first switch to disconnect both terminals through the first control circuit when the first forced closing signal is enabled, wherein a first terminal of the first switch receives the first input voltage of the first connection port, and a second terminal of the first switch is coupled to an output terminal of the first control circuit.

11. The method according to claim 10, wherein the step of determining the first preset value according to the state of the first switch activation signal correspondingly comprises:

setting the first preset value as a first reference value when the first switch activation signal is disabled; and setting the first preset value as a second reference value when the first switch activation signal is enabled, wherein the first reference value is less than the second reference value, and the second reference value is greater than a rated operating voltage of the electronic device.

12. The method according to claim 10, further comprising:

determining whether the first input voltage of the first connection port is less than a reset voltage value when the first abnormal signal has been enabled on the first abnormal state detection pin, wherein the reset voltage value is less than the first reference value; and disabling the first abnormal signal on the abnormal state detection pin through the first controller when the first input voltage is less than the reset voltage value.

13. The method according to claim 10, wherein the first controller starts to detect whether the first input voltage of the first connection port is greater than the first preset value after a preset time after the electronic device is activated.

14. The method according to claim 10, wherein the electronic device further comprises a second connection port and a second control circuit, wherein the first abnormal state detection pin of the first controller is coupled to a second forced closing pin of the second controller so that the first abnormal signal of the first control circuit is served as a second forced closing signal of the second control circuit, and a second abnormal state detection pin of the second controller is coupled to the first forced closing pin of the first controller so that the second abnormal signal generated by the second control circuit is served as the first forced closing signal of the first control circuit.

15. The method according to claim 10, wherein when a rated load power of the first connection port is greater than a rated load power of the first controller, the electronic device further comprises at least one third control circuit identical to the first control circuit, wherein corresponding terminals of the first control circuit and the at least one third control circuit are connected to each other in parallel.

* * * * *